2,769,805

METALLIFEROUS TRISAZO-DYESTUFFS

Walter Hanhart, Riehen, Switzerland, assignor to Ciba Limited, Basel, Switzerland, a Swiss firm No Drawing. Application March 23, 1953,
Serial No. 344,203

Claims priority, application Switzerland March 31, 1952

10 Claims. (Cl. 260—145)

This invention provides new metalliferous trisazo-dyestuffs which, as for example in the case of the complex compound of the formula (1)

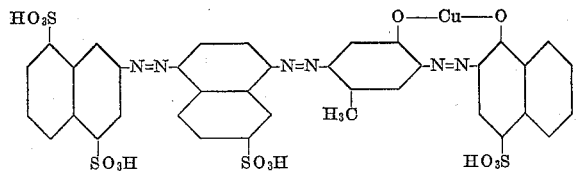

correspond to the general formula (2)

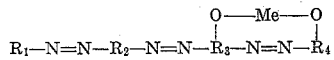

in which the group —O—Me—O— is bound to the radicals $R_3$ and $R_4$ in positions vicinal to the azo linkage, Me represents the metal copper or nickel, $R_1$ represents the radical of an initial component free from hydroxyl groups, $R_2$ represents an aromatic radical containing at most 10 aryl carbon atoms, $R_3$ represents an aromatic radical of the benzene series, and $R_4$ represents a naphthalene radical free from amino groups and containing at least one sulfonic acid group or represents a pyrazolone radical, and in which the azo linkages connected to the radicals $R_2$ and $R_3$ are bound in para-position relatively to one another.

More particularly the invention provides trisazo dyestuffs which correspond to the Formula 2 in which $R_1$ stands for the radical of a diazo component containing at least one sulfonic acid group and selected from the group consisting of aminobenzenes, aminonaphthalenes, aminodiphenyls and 2-(4'-aminophenyl)-benzthiazoles, $R_2$ stands for an aromatic radical containing only carbocyclic rings and at most ten aromatically bound carbon atoms carrying both azo groups attached thereto in para-positions to one another, $R_3$ stands for a benzene radical carrying both azo groups in para-position to one another, $R_4$ stands for the radical of a hydroxynaphthalene free from amino groups and coupling in ortho-position to an hydroxyl group or the radical of a 1-pheny-3-methyl-5-pyrazolone, and Me stand for nickel or copper, the whole azo dyestuff containing at least three and at most six sulfonic acid groups, and the group —O—Me—O— being bound to vicinal positions with respect to the azo group.

The metalliferous azo dyestuffs of the general Formula 2 are made in accordance with the invention by treating a trisazo-dyestuff corresponding to the general formula (3)   $R_1$—N=N—$R_2$—N=N—$R_3$—N=N—$R_4$ in which $R_1$ represents the radical of an initial component free from hydroxyl groups, $R_2$ represents an aromatic radical containing at most 10 aryl carbon atoms, $R_3$ represents an aromatic radical of the benzene series, and $R_4$ represents a radical of a hydroxynaphthalene sulfonic acid free from amino groups and bound to the azo-linkage in a position vicinal to a hydroxyl group or represents a pyrazolone radical, and in which the azo linkages connected to the radicals $R_2$ and $R_3$ are bound in para-position relatively to one another, and the radical $R_3$ contains an alkoxy group of low molecular weight in a position vicinal to the azo linkage connecting $R_3$ with $R_4$, with an agent yielding copper or nickel under conditions such that the corresponding ortho:ortho'-dihydroxy-azo-metal complex is formed.

The trisazo-dyestuffs of the Formula 3 serving as starting materials may be prepared by coupling a diazotized initial component free from hydroxyl groups with a middle component of the benzene or naphthalene series, that is to say, with an aminobenzene or aminonaphthalene capable of coupling in para-position relatively to the amino group, then diazotizing the amino-monoazo-dyestuff, and coupling the diazo compound with a middle component of the benzene series which contains an alkoxy group of low molecular weight in a position vicinal to the amino group, converting the resulting amino-disazo-dyestuff into its diazo compound, and finally coupling the latter either with a hydroxynaphthalene sulfonic acid free from amino groups or with a pyrazolone.

As initial components, from which the dyestuff of the Formula 3 are to be prepared by the method described above, there come into consideration, for example, aryl amines of the benzene or naphthalene series or those having more than two fused 6-membered rings which arylamines are free from hydroxyl groups, but may be otherwise substituted in any desired manner, and advantageously contain sulfonic acid groups. As examples there may be mentioned amino-benzene sulfonic acids such as 1-aminobenzene-3- or -4-sulfonic acid, amino-benzene-2:5-disulfonic acid, aminonaphthalene sulfonic acids such as 1-aminonaphthalene-4- or -5-sulfonic acid, 1-amino-4-nitronaphthalene-5-sulfonic acid, 1-aminonaphthalene-5:7-disulfonic acid, 2-aminonaphthalene-4:8- or -5:7-disulfonic acid or 2-amino-pyrene disulfonic acid, and also amines which contain two non-fused 6-membered rings such as 4-amino-4'-acetylamino-1:1'-diphenyl-3-sulfonic acid, or initial components containing heterocyclic rings such as 2-(4'-aminophenyl)-6-methyl-benzthiazole sulfonic acid.

The first middle component, which yields the radical $R_2$ in the dyestuffs of the Formula 3, may be of the benzene series, for example, aminobenzene, 1-amino-2- or -3-methyl-benzene or 1-amino-2:5-dimethylbenzene. In some cases it is especially advantageous to use middle components of the naphthalene series such as 1-aminonaphthalene, 1-aminonaphthalene-6- or -7-sulfonic acid or the commercial mixture of these two acids.

The second middle component yielding the radical $R_3$ must be one of the benzene series and must also contain in a position vicinal to the amino group an alkoxy group of low molecular weight, that is to say, one which contains only few carbon atoms such, for example, as an ethoxy group or advantageously a methoxy group. As examples of such middle components there may be mentioned more especially amino-ortho-methoxybenzenes such as 1-amino - 2 - methoxybenzene, 1-amino-2-methoxy-5-methylbenzene, 1-amino-2:5-dimethoxybenzene, and also 1-amino-2-ethoxy-5-methylbenzene.

As end components for making the trisazo-dyestuffs there come into consideration advantageously hydroxynaphthalene sulfonic acids capable of coupling in a position vicinal to a hydroxyl group. These components may contain one or 2 or, if desired, even 3 sulfonic acid groups and may contain further substituents, with the exception of free or substituted amino groups, such as an additional hydroxyl group, a halogen atom especially chlorine, or an alkoxy group. As examples there may be mentioned 1-hydroxynaphthalene-4-sulfonic acid, 2-hydroxynaphthalene-4- or -6- or -7-sulfonic acid, 1-hydroxynaphthalene-3:6- or -3:8- or -4:8-disulfonic acid, 2-hydroxynaphthalene-3:6- or -6:8-disulfonic acid and 1:8-dihydroxynaphthalene-3:6-disulfonic acid.

Instead of hydroxynaphthalene sulfonic acids there may be used as end components pyrazolones such as 3-methyl-5-pyrazolone, 1-phenyl-3-methyl-5-pyrazolone, 1-phenyl-3-methyl-5-pyrazolone-3'-sulfonic acid or -3'-sulfonic acid amide or 1-phenyl-5-pyrazolone-3-carboxylic acid.

It is of advantage so to choose the starting materials that the resulting trisazo-dyestuff contains at least three and at most six, and advantageously three to four, sulfonic acid groups. When only a few sulfonic acid groups are present, and the solubility in water of the metalliferous dyestuffs obtainable therefrom in accordance with the present process is insufficient, the solubility can in general be substantially improved by the presence of other groups imparting solubility such as carboxylic acid groups or sulfonic acid amide groups.

The reactions necessary for making the trisazo-dyestuffs used as starting materials in the present process, that is to say, the diazotizations and couplings, may be carried out by the usual known methods. Couplings with the middle components are usually carried out with advantage in a weakly acid medium. Middle components having a low capacity for coupling such as aminobenzene, 2-methyl- or 2-methoxy-1-aminobenzene are advantageously coupled in the form of their ω-methane sulfonic acids, and the ω-methane sulfonic acid radical is subsequently split off. For the final coupling with the hydroxynaphthalene sulfonic acids it is of advantage to work in an alkaline medium, for example, a medium rendered alkaline with an alkali carbonate, and, if desired, to accelerate the reaction by suitable additions such as alcohol or especially pyridine.

As a rule it is of advantage to separate the trisazo-dyestuff from the coupling mixture before carrying out the metallization, and then to metallize the dyestuff without any intermediate drying. In some cases, however, it is unnecessary to isolate the dyestuff from the coupling mixture.

As agents yielding metal there are used in the present process agents yielding nickel or advantageously those yielding copper. There may be used, for example, salts of divalent nickel such as nickel (Ni··) sulfate, salts of mono- or divalent copper, such as cuprous chloride or cupric sulfate, and also compounds which contain these metals in complex union. In the latter connection there are especially suitable nickel- or copper-amine complexes such, for example, as the complex nickel or copper compounds obtainable from ammonia, alkylamines such as ethylamine, morpholine, pyridine, picolines or piperidine. In order to ensure the complete splitting off of the alkyl groups from the alkoxy groups with the formation of a metal complex of the trisazo-dyestuff it is usually necessary to carry out the treatment with the agent yielding metal at a raised temperature, for example, at about 90° C. and for several hours. It is also of advantage to work in an aqueous medium. If desired, the treatment with the agent yielding metal may be carried out in the presence of suitable additions. As such additions there may be mentioned, bases such as ammonia or pyridine, for example, an excess of the base which is present in the molecule of the metal amine complex when such is used as an agent yielding metal.

In some cases very good results are obtained by carrying out the treatment with the agent yielding metal in the presence of an ethanolamine.

The metalliferous dyestuffs of the invention are new and correspond to the Formula 2 given above. The latter formula undoubtedly represents the correct stoichiometric proportions of nickel or copper and the correct position of the metal atom in the complex. However, the distribution of main and secondary valencies in the complex union of the metal has not been established with certainty.

These trisazo-dyestuffs produced from simple components are suitable for dyeing or printing a very wide variety of materials, for example, those of animal origin such as wool or leather. Owing to their good affinity for vegetable fibers they are especially suitable for dyeing or printing cellulose-containing materials such as linen, cotton and artificial silk or staple fibers of regenerated cellulose. They possess good levelling properties, which is also of advantage for dyeing streaky artificial silk from viscose. The dyeings obtainable with the new metalliferous dyestuffs on cellulose fibers are usually distinguished by their very desirable grey tints and also by their good properties of wet fastness and above all by their very good fastness to light. Even in the case of weak dyeings the fastness to light is surprising, and generally speaking the fastness to light is not diminished to any important extent by the usual treatments used to impart anti-creasing properties.

The following examples illustrate the invention the parts and percentages being by weight unless otherwise stated and the relationship of parts by weight to parts by volume being the same as that of the kilogram to the liter:

*Example 1*

7.5 parts of the sodium salt of the disazo-dyestuff obtained by coupling diazotized 2-aminonaphthalene-4:8-disulfonic acid with 1-aminonaphthalene-7-sulfonic acid, further diazotizing and then coupling with 1-amino-2-methoxy-5-methylbenzene, are dissolved in 100 parts of warm water, cooled with ice to 15–20° C., and diazotized by the addition of 0.7 part of sodium nitrite dissolved in 5 parts of water and pouring in 3.5 parts of hydrochloric acid of 30 percent strength which has been diluted with about 6 parts of water. The mixture is stirred for about 2 hours at 10–15° C., and the diazo compound is then coupled with a solution, rendered alkaline with sodium carbonate, of 2.3 parts of 1-hydroxynaphthalene-4-sulfonic acid. The coupling may be accelerated by the addition of a small amount of pyridine. When the diazo compound can no longer be detected, there are added approximately 10 parts of sodium chloride for every 100 parts by volume of the coupling mixture, and the dyestuff is filtered off. In order to convert the dyestuff into its complex copper compound, the dyestuff is dissolved in 300 parts of hot water, 100 parts of pyridine are added, followed by a copper solution consisting of 3 parts of crystalline copper sulfate, 12 parts of water and 4.8 parts by volume of ammonia solution of 30 percent strength. The whole is stirred for about 6 hours at 90–95° C., the pyridine is distilled off in vacuo, and the dyestuff of the formula

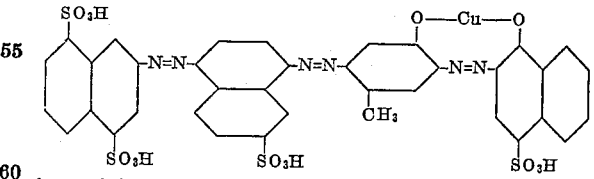

is precipitated by the addition of sodium chloride. When dry, the dyestuff is a blackish powder which dissolves in water with a grey-blue coloration and in concentrated sulfuric acid with a reddish blue coloration, and dyes cotton grey tints which are fast to light.

*Example 2*

The amino-disazo-dyestuff used in Example 1 is diazotized as described in that example and coupled in a solution rendered alkaline with sodium carbonate, and advantageously with the addition of a small amount of pyridine, with 3.2 parts of 1-hydroxynaphthalene-4:8-disulfonic acid. When the coupling has finished there are added about 5 parts of sodium chloride for every 100 parts by volume of the mixture, and the dyestuff is filtered off. The dyestuff is dissolved in 200 parts of hot water and 40 parts of pyridine, and, after the addition of a copper solution consisting of 3 parts of crystalline copper sulfate, 12 parts of water and 4.8 parts by volume of ammonia solution of 30 percent strength, the whole is stirred for 6 hours at 90–95°. The pyridine is then distilled off in vacuo and the dyestuff is precipitated by the addition of about 30 parts of sodium chloride. The dyestuff when dry is a blackish powder which dissolves in water with a greenish blue coloration and in concentrated sulfuric acid with a reddish blue coloration, and dyes cotton grey tints which are fast to light.

further diazotizing and then coupling with 1-amino-2-methylbenzene, are diazotized as described in Example 1. The resulting thickly liquid diazo-magma is coupled with 3.2 parts of 1-hydroxynaphthalene-4:8-disulfonic acid in the presence of a small amount of pyridine in a solution rendered alkaline with sodium carbonate at 0–5° C. When the coupling is finished the precipitated dyestuff is filtered off. It is dissolved in 200 parts of hot water and 40 parts of pyridine and converted into its copper compound as described in Example 1. The precipitated and dried dyestuff of the formula

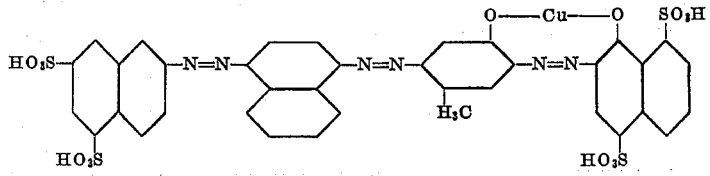

A dyestuff which dyes somewhat more greenish shades of similar fastness to light is produced by using 1-hydroxynaphthalene-3:8-disulfonic acid as end component.

The dyestuff obtained by using 2-hydroxynaphthalene-4-sulfonic acid yields an olive-grey tint.

Example 3

6.5 parts of the sodium salt of the disazo-dyestuff, which is obtained by coupling diazotized 2-aminonaphthalene-4:8-disulfonic acid with 1-aminonaphthalene, further diazotizing and then coupling with 1-amino-2-methoxy-5-methylbenzene, are dissolved in 100 parts of warm water, then cooled with ice to 18–20° C., and diazotized by the addition of 0.7 part of sodium nitrite dissolved in 5 parts of water and by pouring in 3 parts of hydrochloric acid of 30 percent strength which has been diluted with about 6 parts of water. Stirring is continued until non-diazotized dyestuff can no longer be detected, and coupling is then carried out at 0–5° C. with 3.2 parts of 1-hydroxynaphthalene-3:8-disulfonic acid in a solution rendered alkaline with sodium carbonate, and advantageously in the presence of a small amount of pyridine. When the diazo compound can no longer be detected, about 10 parts of sodium chloride are added for every 100 parts by volume of the coupling mixture, and the dyestuff is filtered off. In order to convert the dyestuff into its complex copper compound it is dissolved in 300 parts of hot water, 60 parts of pyridine are added and then a copper solution consisting of 3 parts of crystalline copper sulfate, 12 parts of water and 4.8 parts by volume of ammonia solution of 30 percent strength. The whole is stirred for about 6 hours at 90–95° C. and the dyestuff of the formula

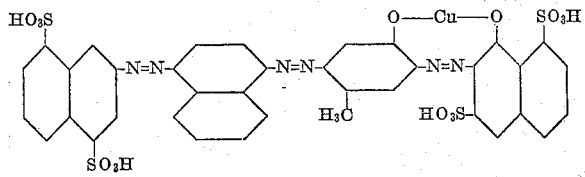

is precipitated by the addition of 300 parts of sodium chloride solution of 30 percent strength. The dry dyestuff is a blackish powder which dissolves in water with a blue coloration and in concentrated sulfuric acid with a dull blue coloration, and dyes cotton level blue-grey tints which are fast to light.

The coppering may also be carried out in the absence of pyridine, if desired in the presence of a small quantity of ethanolamine.

A valuable dyestuff is also obtained by using, instead of copper sulfate, an equivalent quantity of nickel sulfate.

Example 4

6.5 parts of the sodium salt of the disazo-dyestuff, which is obtained by coupling diazotized 2-aminonaphthalene-5:7-disulfonic acid with 1-aminonaphthalene, is a blackish powder which dissolves in water with a blue coloration and in concentrated sulfuric acid with a dull violet coloration. On cotton it yields level grey dyeings of good fastness to light.

Example 5

7.7 parts of the sodium salt of the disazo-dyestuff, which is obtained by coupling diazotized 2-aminonaphthalene-4:8-disulfonic acid with 1-aminonaphthalene-7-sulfonic acid, further diazotizing and then coupling with 1-amino-2:5-dimethoxybenzene, are dissolved in 100 parts of water and diazotized at about 20° C. after the addition of 0.7 part of sodium nitrite dissolved in 5 parts of water and 3 parts of hydrochloric acid of 30 percent strength diluted with a small amount of water. The whole is stirred for a few hours and then coupled at 0–5° C. with 2.3 parts of 1-hydroxynaphthalene-4-sulfonic acid in a solution rendered alkaline with sodium carbonate, and advantageously in the presence of a small amount of pyridine. After a few hours, when the dyestuff has precipitated sufficiently, it is filtered off. It is dissolved in 200 parts of hot water and 40 parts of pyridine and converted into its copper compound of the formula

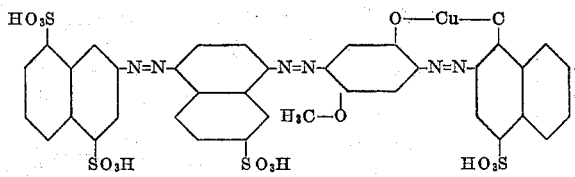

as described in Example 1. The copper compound in the dry state is a blackish powder which dissolves in water with a green-blue coloration and in concentrated sulfuric acid with a dull blue coloration, and dyes cotton very level blackish grey tints which are fast to light.

A dyestuff having similar properties is obtained by coupling the diazo disazo-compound with 1-phenyl-3-methyl-5-pyrazolone-3'-sulfonic acid amide instead of 1-hydroxynaphthalene-4-sulfonic acid.

Example 6

6 parts of the sodium salt of the disazo-dyestuff, which is obtained by coupling diazotized 1-aminobenzene-4-sulfonic acid with 1-aminonaphthalene-7-sulfonic acid, further diazotizing and then coupling with 1-amino-2-methoxy-5-methylbenzene, are diazotized as described in Example 1 and then coupled at 0–5° C. with 2.3 parts of 1-hydroxynaphthalene-4-sulfonic acid in a solution rendered alkaline with sodium carbonate. The coupling may be accelerated by the addition of a small amount of pyridine. The dyestuff is precipitated by the addition of 10–15 parts of sodium chloride for every 100 parts by volume of coupling mixture, and the dyestuff is filtered off. It is dissolved in 100 parts of hot water and 40 parts of pyridine, and converted into its copper compound as described in Example 1. The dry dyestuff is a blackish powder which dissolves in water and in concentrated sulfuric acid with a dull reddish blue coloration. It yields on cotton very level gray tints which are fast to light.

By using 1-aminobenzene-3-sulfonic acid as initial component a very similar dyestuff is obtained.

In the following table are given a few further cupriferous trisazo-dyestuffs which can be made in the manner described in the foregoing examples by coppering accompanied by de-alkylation trisazo-dyestuffs obtainable from the initial components A, the middle components B and C and the end components D:

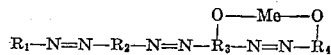

| | A → | B → | C → | D | Tint of cupriferous dyestuff on cotton |
|---|---|---|---|---|---|
| 1 | | | | | reddish grey. |
| 2 | | | | | grey green. |
| 3 | | | | | greenish grey. |
| 4 | | | | | blackish grey. |
| 5 | | | | | grey. |
| 6 | | | | | blue green. |

Example 7

A dyebath is prepared which contains in 3000 parts of water 0.5 part of the cupriferous dyestuff obtainable as described in Example 1 and 30 parts of crystalline sodium sulfate. 100 parts of cotton are entered into the dyebath at 50° C., the temperature is raised to 95° C., and dyeing is carried on for one hour at 90–95° C. The cotton is then rinsed and dried. It is dyed a level greenish grey tint, and the dyeing is distinguished by a very good fastness to light.

What is claimed is:

1. A metalliferous trisazo dyestuff of the general formula $$R_1-N=N-R_2-N=N-R_3-N=N-R_4$$
$$\overset{O-Me-O}{\phantom{R_1-N=N-R_2-N=N-R_3-N=N-R_4}}$$

wherein $R_1$ stands for the radical of a diazo component containing at least one sulfonic acid group and selected from the group consisting of aminobenzenes, aminonaphthalenes, aminodiphenyls and 2-(4'-aminophenyl)-benzthiazoles, $R_2$ stands for an aromatic radical containing only carbocyclic rings and at most 10 aromatically bound carbon atoms carrying both azo groups attached thereto in para positions to one another, $R_3$ stands for a benzene radical carrying both azo groups in para positions to one another, $R_4$ stands for the radical of a member selected from the group consisting of hydroxynaphthalenes free from amino groups and coupling in ortho position to a hydroxyl group and 1-phenyl-3-methyl-5-pyrazolones, and Me stands for a member selected from the group consisting of the metals nickel and copper, the whole azo dyestuff containing at least three and at most six sulfonic acid groups, the metallized hydroxyl group indicated in the formula being the sole hydroxyl group bound to $R_1$, $R_2$ and $R_3$, and the group —O—Me—O— being bound to vicinal positions with respect to the azo group.

2. A cupriferous trisazo dyestuff of the general formula $$R_1-N=N-R_2-N=N-\overset{\overset{O---Cu---O}{|}}{R_3}-N=N-\overset{|}{R_4}$$

wherein $R_1$ stands for an aromatic radical containing at least one sulfonic acid group, only carbocyclic rings and at the most 10 aromatically bound carbon atoms, $R_2$ stands for an aromatic radical containing only carbocyclic rings and at most 10 aromatically bound carbon atoms carrying both azo groups attached thereto in para positions to one another, $R_3$ stands for a benzene radical carrying both azo groups in para positions to one another, $R_4$ stands for the radical of a hydroxynaphthalene sulfonic acid free from amino groups and coupling in ortho position to a hydroxyl group, the whole azo dyestuff containing at least three and at most six sulfonic acid groups, the metallized hydroxyl group indicated in the formula being the sole hydroxyl group bound to $R_1$, $R_2$ and $R_3$, and the group —O—Cu—O— being bound to vicinal positions with respect to the azo group.

3. A cupriferous trisazo dyestuff of the general formula $$R_1-N=N-R_5-N=N-\overset{\overset{O---Cu---O}{|}}{R_3}-N=N-\overset{|}{R_4}$$

wherein $R_1$ stands for an aromatic radical containing at least one sulfonic acid group, only carbocyclic rings and at the most 10 aromatically bound carbon atoms, $R_5$ stands for a naphthalene radical attached to the azo groups in 1- and 4-position respectively, $R_3$ stands for a benzene radical attached to the azo groups in 1- and 4-positions respectively, $R_4$ stands for the radical of a hydroxynaphthalene sulfonic acid free from amino groups and coupling in ortho position to a hydroxyl group, the whole azo dyestuff containing at least three and at most six sulfonic acid groups, the metallized hydroxyl group indicated in the formula being the sole hydroxyl group bound to $R_1$, $R_5$ and $R_3$, and the group —O—Cu—O— being bound to vicinal positions with respect to the azo group.

4. A cupriferous trisazo dyestuff of the general formula $$R_6-N=N-R_5-N=N-\overset{\overset{O---Cu---O}{|}}{R_3}-N=N-\overset{|}{R_4}$$

wherein $R_6$ stands for a naphthalene radical containing at least one sulfonic acid group, $R_5$ stands for a naphthalene radical attached to the azo groups in 1- and 4-position respectively, $R_3$ stands for a benzene radical attached to the azo groups in 1- and 4-positions respectively, $R_4$ stands for the radical of a hydroxynaphthalene sulfonic acid free from amino groups and coupling in ortho position to a hydroxyl group, the whole azo dyestuff containing at least three and at most six sulfonic acid groups, the metallized hydroxyl group indicated in the formula being the sole hydroxyl group bound to $R_6$, $R_5$ and $R_3$, and the group —O—Cu—O— being bound to vicinal positions with respect to the azo group.

5. A cupriferous trisazo dyestuff of the general formula $$R_7-N=N-R_5-N=N-\overset{\overset{O---Cu---O}{|}}{R_3}-N=N-\overset{|}{R_4}$$

wherein $R_7$ stands for the radical of a 2-(4'-aminophenyl)-benzthiazole-sulfonic acid, $R_5$ stands for a naphthalene radical attached to the azo groups in 1- and 4-position respectively, $R_3$ stands for a benzene radical attached to the azo groups in 1- and 4-positions respectively, $R_4$ stands for the radical of a hydroxynaphthalene sulfonic acid free from amino groups and coupling in ortho position to a hydroxyl group, the whole azo dyestuff containing at least three and at most six sulfonic acid groups, the metallized hydroxyl group indicated in the formula being the sole hydroxyl group bound to $R_7$, $R_5$ and $R_3$, and the group —O—Cu—O— being bound to vicinal positions with respect to the azo group.

6. The cupriferous trisazo dyestuff of the formula

7. The cupriferous trisazo dyestuff of the formula

8. The cupriferous trisazo dyestuff of the formula

9. The cupriferous trisazo dyestuff of the formula

10. The cupriferous trisazo dyestuff of the formula

References Cited in the file of this patent

UNITED STATES PATENTS 2,427,539    Wehrli _____ Sept. 16, 1947